(12) United States Patent
Sundermier et al.

(10) Patent No.: US 10,073,764 B1
(45) Date of Patent: Sep. 11, 2018

(54) METHOD FOR INSTRUCTION SEQUENCE EXECUTION ANALYSIS AND VISUALIZATION

(71) Applicant: National Technology & Engineering Solutions of Sandia, LLC, Albuquerque, NM (US)

(72) Inventors: Amy Sundermier, Albuquerque, NM (US); Bettina K. Arpin, Albuquerque, NM (US); David Karmol, Seattle, WA (US); Lawrence P. Ray, Albuquerque, NM (US); Kenneth Michael Munoz, Rio Rancho, NM (US); William Lawry, Albuquerque, NM (US); Jamie L. Coram, Albuquerque, NM (US); Thomas Anthony Artale, Erie, CO (US); Patrick DeMoss, Albuquerque, NM (US); Lucas Leighton Nunno, Albuquerque, NM (US); Aaron Easter, Blue Springs, MO (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 47 days.

(21) Appl. No.: 14/812,842

(22) Filed: Jul. 29, 2015

Related U.S. Application Data (60) Provisional application No. 62/128,864, filed on Mar. 5, 2015.

(51) Int. Cl.
*G06F 9/44* (2018.01)
*G06F 9/45* (2006.01)
(Continued)

(52) U.S. Cl.
CPC ............ *G06F 11/3692* (2013.01); *G06F 8/70* (2013.01); *G06F 11/3688* (2013.01); *G06F 8/75* (2013.01)

(58) Field of Classification Search
CPC .... G06F 8/41–8/437; G06F 8/70; G06F 8/75; G06F 8/314; G06F 11/3604;
(Continued)

(56) References Cited

U.S. PATENT DOCUMENTS 7,093,231 B2 * 8/2006 Nuss ........................ G06F 8/31
707/999.006
7,620,946 B2 * 11/2009 Russell ............... G06F 17/5045
717/126

(Continued)

OTHER PUBLICATIONS

Luiz DeRose, CATCH—A Call-Graph Based Automatic Tool for Capture of Hardware Performance Metrics for MPI and OpenMP Applications, 2002 (Year: 2002).*

(Continued)

*Primary Examiner* — Mongbao Nguyen
(74) *Attorney, Agent, or Firm* — Medley, Behrens & Lewis, LLC; Samantha Updegraff (57) ABSTRACT

Various technologies pertaining to computer-executable instruction sequence forensics are described herein. In a general embodiment, an application development framework supports a function library that includes a plurality of recording functions. Calls to these functions are inserted into source code or bytecode of the computer-executable instruction sequence. The source code is then compiled, resulting in formation of instrumented machine code of the computer-executable instruction sequence. Alternately, the runtime environment interprets instrumented bytecode for the instruction sequence. A processor executes the machine code, and the called functions cause the processor to generate forensic data pertaining to portions of the computer-
(Continued)

executable instruction sequence that correspond to locations in the source code where the calls were inserted. An execution instance of the computer-executable instruction sequence is visualized based upon the forensic data.

16 Claims, 8 Drawing Sheets

(51) Int. Cl.
  *G06F 11/36* (2006.01)
  *G06F 8/70* (2018.01)
  *G06F 8/75* (2018.01)
(58) Field of Classification Search
  CPC .. G06F 11/36–11/3696; G06F 11/3672; G06F 11/3688; G06F 11/3612; G06F 8/4441; G06F 8/443
  See application file for complete search history.

(56) References Cited

U.S. PATENT DOCUMENTS

| | | | |
|---|---|---|---|
| 7,984,389 B2 | 7/2011 | Rusu et al. | |
| 8,667,474 B2* | 3/2014 | Radigan | G06F 8/456 717/136 |
| 8,776,032 B2* | 7/2014 | Hawblitzel | G06F 9/44589 717/130 |
| 8,869,125 B2* | 10/2014 | Emani | G06F 8/41 717/149 |
| 8,898,647 B2* | 11/2014 | Sobolev | G06F 11/3676 717/130 |
| 8,972,899 B2 | 3/2015 | Carlsson et al. | |
| 9,043,775 B2* | 5/2015 | Emani | G06F 8/452 717/154 |
| 9,424,309 B2* | 8/2016 | Ramachandra | G06F 17/30457 |
| 9,535,726 B2* | 1/2017 | Lagerblad | |
| 9,619,375 B2* | 4/2017 | Avgerinos | G06F 11/3688 |
| 2004/0054990 A1* | 3/2004 | Liao | G06F 8/4442 717/124 |
| 2005/0204344 A1* | 9/2005 | Shinomi | G06F 8/316 717/124 |
| 2007/0016898 A1* | 1/2007 | Derby | G06F 11/3604 717/144 |
| 2008/0263012 A1* | 10/2008 | Jones | G06F 17/30811 |
| 2009/0249285 A1* | 10/2009 | Li | G06F 11/3644 717/106 |
| 2010/0313157 A1* | 12/2010 | Carlsson | G06F 17/30601 715/769 |
| 2010/0325608 A1* | 12/2010 | Radigan | G06F 8/456 717/106 |
| 2011/0066959 A1* | 3/2011 | Harrold | G06F 8/33 715/762 |
| 2011/0088010 A1* | 4/2011 | Dangeville | G06F 8/10 717/104 |
| 2011/0175905 A1 | 7/2011 | Hao | |
| 2011/0197098 A1* | 8/2011 | Sobolev | G06F 11/3676 714/38.1 |
| 2011/0289207 A1 | 11/2011 | Liu et al. | |
| 2012/0131559 A1* | 5/2012 | Wu | G06F 8/75 717/132 |
| 2013/0074059 A1* | 3/2013 | Emani | G06F 8/452 717/158 |
| 2013/0091387 A1* | 4/2013 | Bohnet | G06F 11/3612 714/38.1 |
| 2013/0145347 A1* | 6/2013 | Karr | G06F 8/75 717/113 |
| 2013/0167129 A1* | 6/2013 | Emani | G06F 8/41 717/151 |
| 2014/0195512 A1* | 7/2014 | Ramachandra | G06F 17/30457 707/713 |
| 2014/0223420 A1* | 8/2014 | Kudlur | G06F 8/4451 717/156 |
| 2015/0339217 A1* | 11/2015 | Avgerinos | G06F 11/3688 717/132 |
| 2015/0370763 A1* | 12/2015 | Wang | G06F 17/2247 715/235 |
| 2016/0042180 A1* | 2/2016 | Sayre | G06F 21/563 726/23 |
| 2016/0092246 A1* | 3/2016 | Lagerblad | G06F 9/44526 719/331 |
| 2016/0124834 A1* | 5/2016 | Davis | G06F 11/366 712/227 |

OTHER PUBLICATIONS

Benjamin Karran, SYNCTRACE: Visual Thread-Interplay Analysis, 2013, pp. 1-9. https://ieeexplore.ieee.org/stamp/stamp.jsp?tp=&arnumber=6650534 (Year: 2013).*
Chungying Zhao, Visualizing Multiple Program Executions to Assist Behaviour Verification, 2009, pp. 113-121. https://pdfs.semanticscholar.org/3317/508b7055598bcaf8be22831244f0791f96e7.pdf (Year: 2009).*
Kristofer Bengtsson, Operation Behavior Modeling using Relation Identification and Visualization Algorithms, 2013, pp. 368-373. https://ieeexplore.ieee.org/stamp/stamp.jsp?tp=&arnumber=6654033 (Year: 2013).*
Daniel K. Osmari, Visualization and Analysis of Parallel Dataflow Execution with Smart Traces, 2014, pp. 165-172. https://serv.cusp.nyu.edu/~hvo/papers/smarttraces.pdf (Year: 2014).*
Carson, et al., "Algorithm Explorer: Visualizing Algorithms in a 3D Multimedia Environment", ACM SIGCSE, vol. 39, No. 1, Mar. 7, 2007, 5 pages.
Malloy, et al., "Exploiting UML Dynamic Object Modeling for the Visualization of C++ Programs", Proceedings of the 2005 ACM Symposium on Software Visualization, ACM, 2005, pp. 105-114.
Shah, et al., "Visualization of Exception Handling Constructs to Support Program Understanding", Proceedings of the 4th ACM Symposium on Software Visualization, ACM, Sep. 16, 2008, pp. 19-28.
Maletic, et al., "MosaiCode: Visualizing Large Scale Software a Tool Demonstration", 2011 6th IEEE International Conference on Visualizing Software for Understanding and Analysis, 2011, 4 pages.

* cited by examiner

METHOD FOR INSTRUCTION SEQUENCE EXECUTION ANALYSIS AND VISUALIZATION

RELATED APPLICATION

This application claims priority to U.S. Provisional Patent Application No. 62/128,864, filed on Mar. 5, 2015, and entitled "METHOD FOR ALGORITHM EXECUTION VISUALIZATION AND ANALYSIS", the entirety of which is incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Software programs are now used to analyze data and to perform countless other tasks in a variety of different fields. As these tasks have grown more complex, the complexity of the programs used to perform them has grown as well. Software programs routinely run into the thousands or millions of lines of code, and it is nearly impossible to manually eliminate all errors that might prevent a program from compiling or prevent the compiled code from operating as the developer(s) originally intended. In the general case, a software program will routinely contain many instruction sequences that perform specific activities needed for the program. A single software instruction sequence within a program may be very large, complex and difficult to debug, and the potential interactions between different software instruction sequences in a program can introduce further unanticipated behavior.

There are categories of software development support tools that have been developed to at least partially alleviate problems at the scale of an entire program. The category of debuggers enables software developers to interactively inspect the behavior of an executing program and instruction sequences in a development environment. The category of static analysis tools enables software developers to examine software source code in a development environment and search for common software errors that can be detected without executing the program. The category of system loggers produce text output from executing programs, where the content of the text was programmed into the source code by a software developer. System loggers are used in both a development and operational environment to provide a software developer with insight into the software behavior.

Debuggers allow software developers to interactively inspect and step through executing program code line by line to search for logic errors that result in unintended operation. Debuggers may also be used to identify a location in a program where a specific condition, or breakpoint, occurs, so that program and instruction sequence behavior can be interactively examined under known conditions. Debuggers are used by software developers in a development environment to troubleshoot a software problem, but are not typically useful for software executing in a production environment. Debuggers are highly intrusive tools because the software is stopped so that the internal logic and state can be inspected by a software developer.

Static analysis tools examine source code and search for flaws without executing the program itself. Static analysis tools analyze source code in a non-runtime environment to understand certain properties of the programs, such as potential memory leaks or unreachable code sections. Static analysis tools are similar to compilers in that the source code is processed to find certain classes of potential errors, but static analysis will not find most logic errors in software. Static analysis tools are useful in a software development environment, but are not routinely run on an operational system during program execution.

System loggers are routinely used to generate text output during software system operation. During software development, a software developer decides what information would be useful to log during operation and introduces source code into the program to interact with the logging service to write text or data to the log. The concept of logging from executing software is well-known to software developers, and the mechanism is widely used in both the initial development through deployment and operation of software systems.

Static analysis tools analyze source code to discover some types of common coding errors, and debuggers are helpful for inspecting programs and searching for flaws in their operation, but these categories of software development tools are generally unable to perform analysis on software in its ultimate operational environment. Given the complexity of modern computer programs, it may be unclear in a given end-user setting why a program is performing the way it is. A program routinely incorporates many software instruction sequences, and a software developer focuses attention on understanding and verifying the behavior of one instruction sequence at a time to demonstrate a correctly functioning program. Isolating the inputs, behavior and outputs of the instruction sequences within a program in an operational environment is not feasible with debuggers or static analysis tools. Furthermore, when a program is deployed in a setting with potentially unpredictable inputs and outputs, it may be desirable to know whether anomalous results generated by the program come from flaws in the instruction sequences or anomalies in the inputs. Conventionally, however, there is no suitable tool to examine instruction sequence execution behavior subsequent to and separate from the execution of the program in an operational environment. The predominant existing tool for operational support such as system loggers often intermix output from many different programs and instruction sequences. In addition, loggers may generate such voluminous quantities of system data that information about the behavior of a specific instruction sequence may be impossible to discern from the logs.

SUMMARY

Various technologies for instruction sequence execution analysis and visualization are described herein. In a general embodiment, a computer instruction sequence is augmented such that execution flow and intermediate values of the instruction sequence are captured using calls to a set of functions in a general-purpose function library, wherein the functions are configured to cause a processor to generate and/or capture data during execution of the instruction sequence. These functions can be used to perform a range of instruction sequence analyses, wherein the analyses include, but are not limited to, analysis of instruction sequences for specific data inputs, review or audit of instruction sequences to verify correct behavior, examination of behavior of an instruction sequence to improve understanding of operation of the instruction sequence, and/or investigation of incorrect instruction sequence behavior to isolate faulty logic. Output of the analyses can be referred to as "forensic data." In an additional example, the instruction sequence analyses described above may be supplemented with visualization capability, to allow the forensic data to be presented and examined in a way that clarifies the operation of the instruction sequence in recorded circumstances.

Additional features and advantages are described herein, and will be apparent from the following Detailed Description and the figures.

DETAILED DESCRIPTION

Various technologies pertaining to collection, recording, and visualization of forensic instruction sequence analysis instrumentation data will now be described with reference to the drawings, where like reference numerals represent like elements throughout. In addition, several functional block diagrams of exemplary systems are illustrated and described herein for purposes of explanation; however, it is to be understood that functionality that is described as being carried out by a single system component may be performed by multiple components. Similarly, for instance, functionality that is described as being carried out by multiple components may be performed by a single component.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

In a general embodiment, the present disclosure is directed to systems and methods for instruction sequence execution visualization and analysis. Within the software community there is a lack of techniques and products that are general enough for instruction sequence forensics that can be applied to diverse systems. There have been advances in the methodologies for data visualization, but software engineers still rely on text output in the form of software debugger displays or logging files from executing software to understand, verify, and troubleshoot instruction sequence behavior.

In alternative embodiments, the disclosure describes systems and methods for dynamically generating graphics from complex instruction sequences during execution to improve instruction sequence forensics by visualizing the decisions made during instruction sequence execution and intermediate and final results that were calculated during instruction sequence execution. Aspects described herein can be applied to software development in general; accordingly, aspects described herein are well-suited for use in numerous industries that use computers. An exemplary advantage provided by aspects described herein is that generation of instruction sequence information may be separated from visualization of such information. Further, aspects described herein are different from conventional software debuggers, because visualization may be undertaken at a much later point in time than the actual execution of the instruction sequence. The aspects described herein are therefore particularly well-suited to forensic discovery of instruction sequence behavior when it is known at a later time that the instruction sequence behavior is to be examined for a specific case of inputs, and it is desirable to know what occurred at the time of the instruction sequence execution. Such aspects can be differentiated from existing technology of static analysis tools, because dynamic runtime structure and value data are captured from an executing instance of the instruction sequence, while static analysis tools focus on static source code analysis.

As will be described in greater detail herein, three major activities can be undertaken in connection with analyzing and visualizing behavior of an instruction sequence execution. A first activity is recording information about structure, execution flow, and intermediate results of the executing instruction sequence. A second activity is collection of the recorded information and placement of the information in a format that is suitable for analysis. A third activity is visualization of the structure, execution flow, and intermediate results of the instruction sequence taken during execution. With more particularity, information can be collected about an execution instance of the instruction sequence, including but not limited to the following types of instruction sequence structure, execution flow, and value information: 1) the beginning and end of an execution instance; 2) the input and output values for the execution instance; 3) branches that were encountered, and the branch that was chosen during the execution instance; 4) loop structures that were executed during the execution instance; 5) subroutines that were executed during the execution instance, including their input argument values and return values; 6) values of variables at desired locations in the execution instance; and 7) explanatory text or notes pertaining to the execution instance.

As will be described in greater detail below, functions that belong to a set of generic library classes can be added to a computer instruction sequence, wherein the functions are configured to cause certain types of execution behavior to be reported. For example, a software engineer can identify at least one point in the instruction sequence and can modify the source code by inserting at least one call at this at least one point, wherein the at least one call is to one or more functions from the generic library classes. During execution, the called function(s) act to cause a processor executing the instruction sequence to record information about the flow of the instruction sequence. In another example, a compiler can be configured to automatically insert function calls into the source code at compile-time; for instance, at the beginning of each loop of a particular type, immediately prior to a certain type of function call in the source code, etc. In another example, a language with a runtime environment to interpret bytecode (such as Java or Python), or an interpreted computer language (such as MATLAB), can record forensic information within the runtime environment for structure, execution flow, and intermediate results for an instruction sequence.

Figure 1:
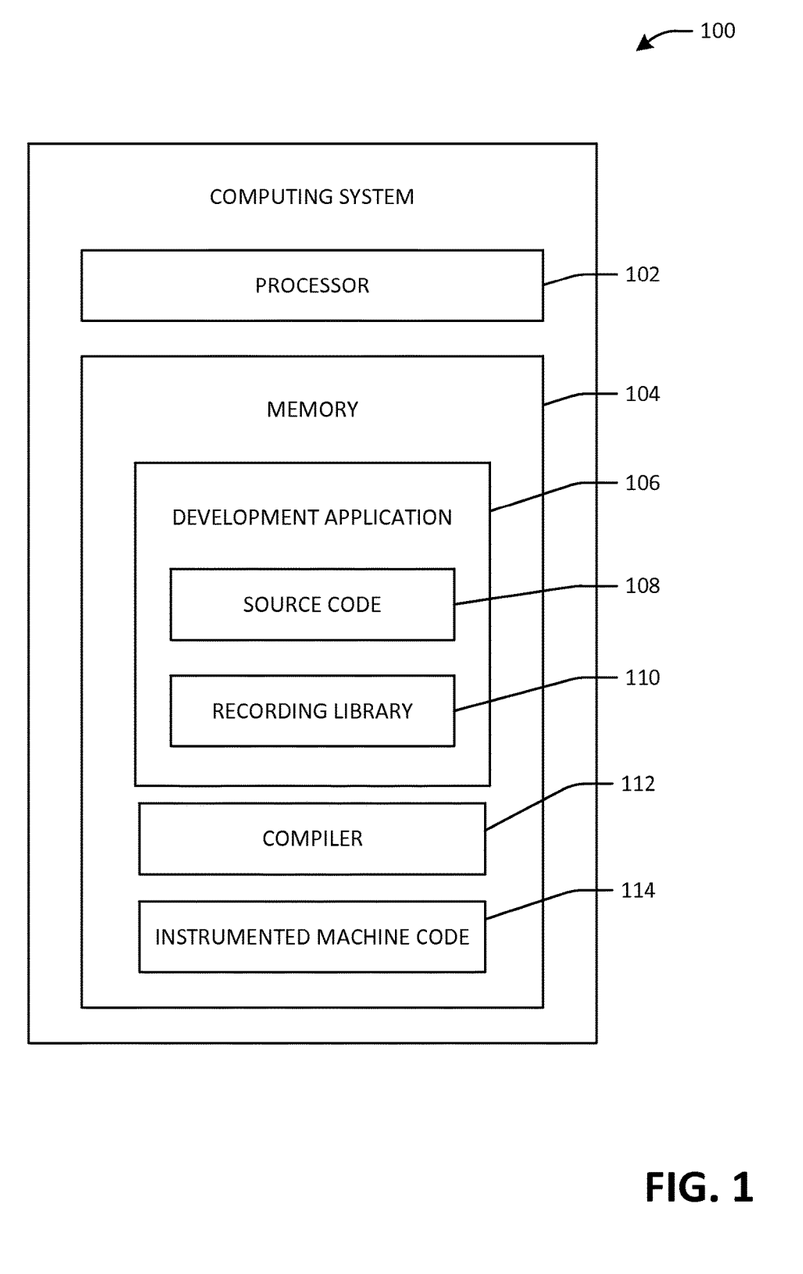
FIG. 1 is a functional block diagram of an exemplary system that facilitates instrumenting source code of an instruction sequence with reporting functions.

With reference to FIG. 1, an exemplary computing system 100 is illustrated, where the computing system 100 facilitates instrumenting source code of an instruction sequence to cause information about execution of the instruction sequence to be recorded. The computing system 100 can be or include a personal computing device, such as a desktop computing device, a laptop computing device, a tablet (slate) computing device, a mobile telephone, or the like. In another example, the computing system 100 can be or include a server computing device that is in communication with a client computing device by way of a suitable network connection, such as an Internet connection, an intranet connection, etc.

The computing system 100 includes a processor 102 and memory 104, where the memory 104 comprises instructions that are executed by the processor 102. The memory 104 comprises a development application 106, which can be any suitable application development framework. For example, the development application 106 can be an integrated development environment (IDE) application. The development application 106 is usable by a programmer (developer) to generate and/or modify source code 108, wherein the source code 108 can be in any suitable programming language. For example, the source code 108 can be written in C, C#, Perl, Visual C, C++, Python, Java, etc. The source code 108 is source code for at least a portion of a software program, wherein it is desirable to understand behavior of the portion of the program (e.g., at particular locations in the source code 108) when the instruction sequence is executed. For example, the source code 108 can be relatively lengthy, where the source code 108 can include thousands or millions of lines of code. Further, the source code 108 can include hundreds or thousands of loops, nested loops, function calls, etc., which may render behavior of the instruction sequence difficult to understand when the program is executed.

The development application 106 further includes a recording library 110, which includes a plurality of callable recording functions that are natively supported by the development application 106. Each recording function in the recording library 110 can cause particular types of data to be recorded. For example, a first recording function, when executed by a processor, can cause the processor to generate or capture data that identifies a first type of control structure (a structure representing transfer of execution from one address to a different address in the memory 104), such as a branch, a jump, a goto, an if, an endif, or the like that was taken during execution of the instruction sequence; a second recording function, when executed by a processor, can cause the processor to generate or capture data that defines or identifies boundaries of an execution instance of the instruction sequence; a third recording function, when executed by a processor, can cause the processor to generate or capture data that identifies input values for an execution instance of the instruction sequence, where the input values may be input values to an instruction sequence, a control structure in the instruction sequence, etc.; a fourth recording function, when executed by a processor, can cause the processor to generate or capture data that identifies output values for an execution instance of the instruction sequence, where the output values may be overall outputs of the instruction sequence, outputs of a control structure in the instruction sequence, etc.; a fifth recording function, when executed by a processor, can cause the processor to generate or capture data that identifies a control structure encountered during an execution instance of the instruction sequence; a sixth recording function, when executed by a processor, can cause the processor to generate or capture data that identifies a second type of control structure (a structure representing repetition of a portion of code), such as a loop (e.g., repeat-until, do-while, for, while-do) encountered during an execution instance of the instruction sequence; a seventh recording function, when executed by a processor, can cause the processor to generate or capture data that identifies subroutine(s) executed during an execution instance of the instruction sequence (as well as input argument values to each subroutine and values returned by each subroutine); an eighth recording function, when executed by a processor, can cause the processor to generate or capture data that identifies values of variables; a ninth recording function, when executed by a processor, can cause the processor to generate explanatory text (e.g., where the text can be defined by the developer or at least partially automatically constructed to identify context pertaining to the execution instance of the instruction sequence). Further, a recording function can be designed to perform any suitable combination of functions described as being performed by the individual recording functions noted above. It is to be understood that the term "control structure" is to encompass both types of control structures referenced above.

An execution instance of the instruction sequence can be defined in a variety of manners. For instance, when the instruction sequence is a long-running instruction sequence, the execution instance can be defined based upon time. For example, an execution instance can be defined as a day, an hour, a block of hours, etc. Alternatively, an execution instance can be defined as separate executions of the instruction sequence.

In an example, the source code 108 includes at least one call to at least one recording function in the recording library 110 supported by the development application 106. For example, a developer with access to the source code 108 can insert calls to appropriate recording functions in the source code 108 at positions in the source code 108 that are of interest to the developer. In an alternative embodiment, a tool (such as a compiler) that analyzes the source code 108 can automatically insert call(s) to the recording functions into the source code 108. For example, the tool can insert a call to a particular recording function at each branch in the source code 108, can insert a call to another recording function at each loop in the source code 108, etc. In an alternative embodiment, a runtime environment (such as a bytecode interpreter) can provide recording functions as the instruction sequence is executed without source code modification. That is, the bytecode interpreter can provide recording features automatically as part of language interpretation.

The computing system 100 also comprises a compiler 112. While shown as being separate from the development application 106, it is to be understood that the compiler 112 may be included in the development application 106. The compiler 112 receives the (instrumented) source code 108 and generates instrumented machine code 114 based upon the source code 108. The processor 102 (or another processor on another machine) can execute the instrumented machine code. As indicated above, the compiler 112 can also be configured to insert call(s) to the recording functions of the recording library 110 into the source code 108 at compile-time. For example, the compiler 112 can be configured to insert calls to recording functions at branches, at loops, at nested loops, etc. As described in greater detail below, the instrumented machine code 114, when executed by a processor, causes the processor to generate and/or capture forensic data, wherein such data is indicative of behavior of an execution instance of the instruction sequence. Additionally or alternatively, while not shown, the computing system 100 can comprise an interpreter that inserts recording functions while interpreting the source code 108.

Figure 2:
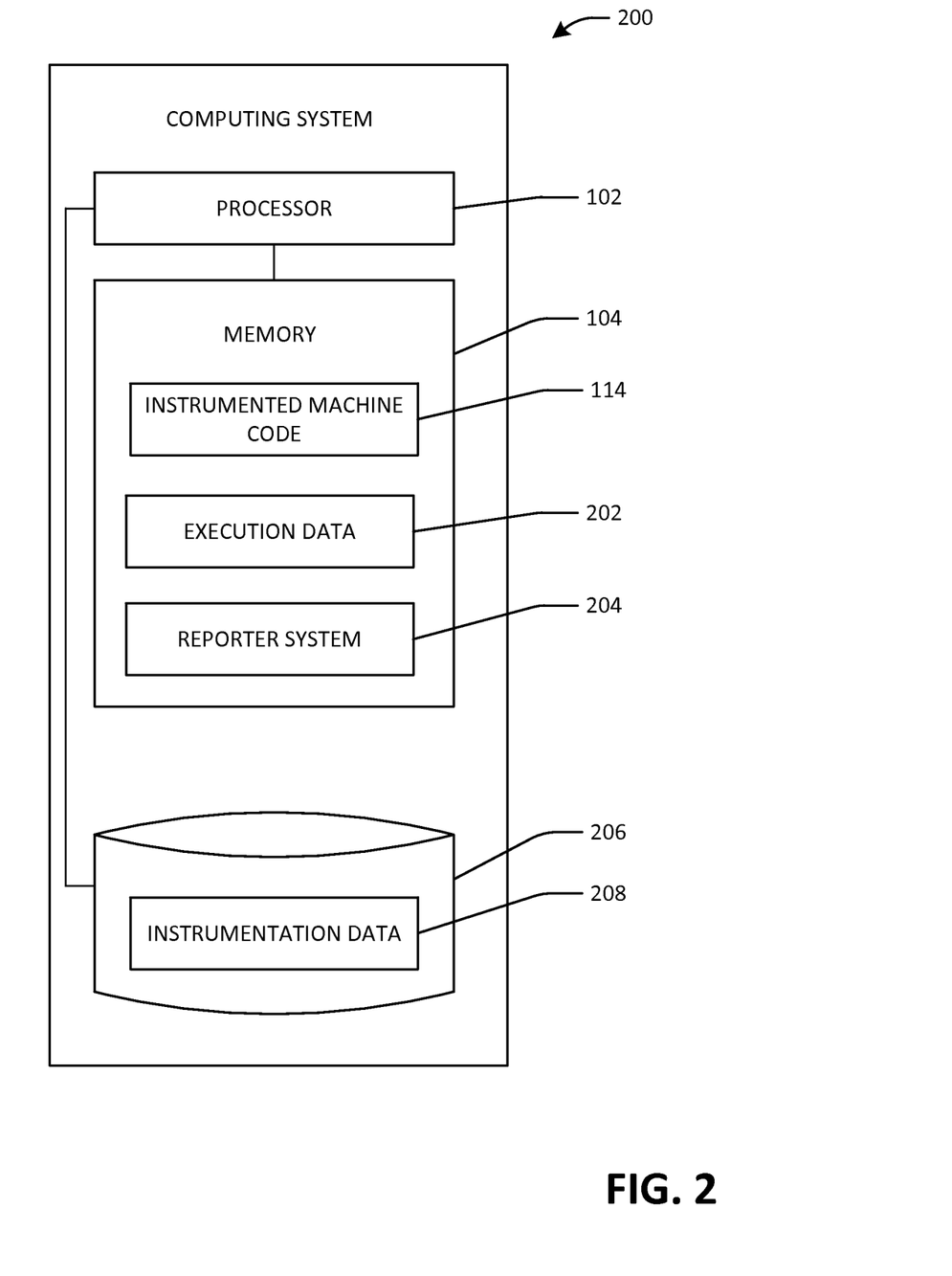
FIG. 2 is a functional block diagram of an exemplary system that facilitates generating execution data at runtime of an instruction sequence and converting the execution data into instrumentation data that is suitable for subsequent processing.

Referring now to FIG. 2, another exemplary computing system 200 is illustrated. The computing system 200 is configured to generate or capture data that is indicative of execution behavior of the instruction sequence. The computing system includes the processor 102 and the memory 104. While represented by the same reference numerals, it is to be understood that the processor and memory shown in FIG. 2 can be different from those shown in FIG. 1.

The memory 104 comprises the instrumented machine code 114. The processor 102 executes the instrumented machine code 114, and thus executes the instruction sequence. The instrumentation in the instrumented machine code 114 causes the processor 102, when executing the instrumented machine code 114, to capture and/or generate execution data 202, which is at least temporarily retained in the memory 104. The execution data 202 includes data pertaining to execution of the instruction sequence, where such data is generated and/or captured in accordance with the recording functions called in the source code 108. The execution data 202 is generated as the processor 102 executes the instrumented machine code 114 (i.e., as the processor 102 executes the instruction sequence).

The computing system 200 also includes a data repository 206 that is accessible to the processor 102 (e.g., by way of a system bus). The memory 104 of the computing system 200 further includes a reporter system 204 that is executed by the processor 102. The reporter system 204 receives the execution data 202 as output by the processor 102, generates instrumentation data 208 based upon the execution data 202, and causes the instrumentation data 208 to be retained in the data repository 206. With more particularity, the reporter system 204 is configured to process the execution data 202 to place the execution data in a format suitable for subsequent processing (i.e., the instrumentation data 208). For instance, the instrumentation data 208 can be an XML file, a comma separated value file, a database file, or the like.

The system 200 exhibits many advantages over conventional runtime data capture systems and/or program analysis tools, such as logging tools. Logging tools tend to utilize a relatively large amount of computing resources for I/O (input/output) and slow execution of the program. A conventional logging tool may be configured to output less data in an operational system to improve overall system performance. Thus, in a conventional logging tool, the developer has little control as to what data is captured or how the logging tool organizes the data during execution of an instruction sequence. In contrast, utilizing the features described herein, the developer can identify what type of data is to be generated and/or captured through use of an appropriate recording function from the recording library 110, and can further identify where in the source code 108 the recording function is to cause the data to be generated and/or captured. This high level of control has heretofore been unavailable to developers.

The features of the computing systems 100 and 200 are particularly well suited for scenarios where a particular execution instance of the instruction sequence is desirably analyzed, where the execution instance may have taken place at a time in the past (e.g., one week ago, one month ago, several months ago, etc.). This may occur when output of the instruction sequence during a certain execution instance later becomes of interest, and an analyst may wish to understand why the software instruction sequence created such output. In an exemplary embodiment, the instrumentation data 208 can be indexed by execution instance, such that the execution instance of interest can be identified relatively quickly and analyzed to understand behavior of the instruction sequence during such execution instance. As will be described in further detail below, at least a portion of the instrumentation data 208 can be visualized, such that an analyst (who may not be a developer) can understand behavior of the software instruction sequence.

Figure 3:
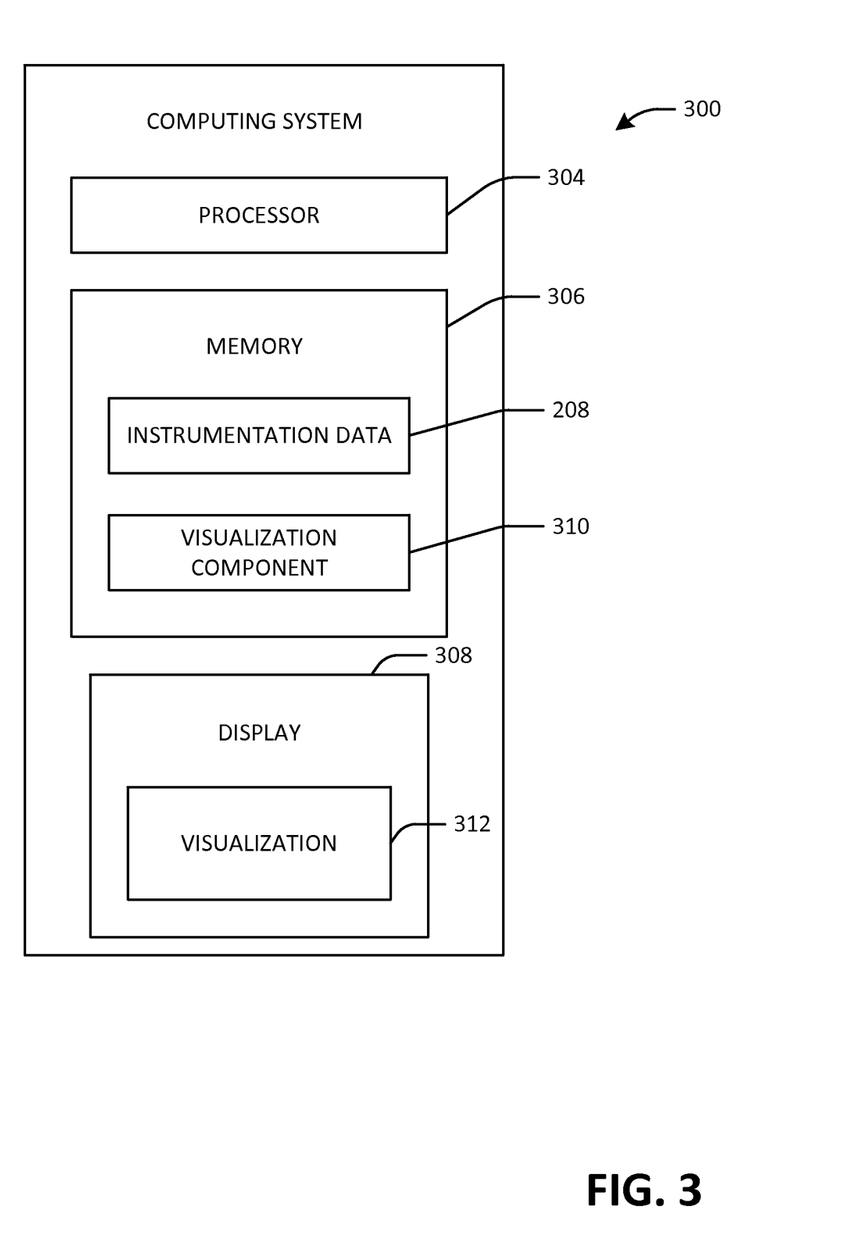
FIG. 3 is a functional block diagram of an exemplary system that facilitates visualization of an execution instance of a computer instruction sequence.

Now referring to FIG. 3, an exemplary computing system 300 is illustrated. The computing system 300 includes a processor 304 and memory 306, where the processor 304 executes instructions retained in the memory 306. The computing system 300 also includes a display 308, where the processor 304 can cause data to be rendered on the display 308. While the display 308 is shown as being co-located with the processor 304 and the memory 306, it is to be understood that the display 308 may be remotely located from the processor 304 and the memory 306. For example, the processor 304 and the memory 306 may be included in a server in a data center, while the display 308 may be a display of a personal computing device that is in network communication with the server.

The memory 306 includes the instrumentation data 208. The memory 306 additionally includes a visualization component 310 that is configured to generate an instruction sequence visualization 312 for presentation on the display 308 based upon the instrumentation data 208. The instruction sequence visualization 312 is a visual representation of an execution instance of the instruction sequence, and is therefore a visual representation of behavior of the instruction sequence during the execution instance. The visualization component 310 can generate the visualization 312 such that it is in a flowchart-like form; hence, the visualization 312 provides temporal information as to the behavior of the instruction sequence in the execution instance of interest to the analyst.

With more particularity, the visualization 312 can comprise interconnected shapes, a shape can be representative of a portion of the instruction sequence encountered by the processor 102 (FIG. 2) during the execution instance. For example, a shape in the interconnected shapes can represent a function, a subroutine, a conditional block (e.g., a branch), a loop, or the like. In another example, a shape can be representative of certain values at a point in the execution instance of the instruction sequence. Further, each shape can be assigned a color, wherein the color assigned to a shape is indicative of a parameter of the feature of the execution instance represented by the shape. For example, a color of a shape can be representative of a type of control structure represented by the shape. Additionally, a type of the shape may be indicative of a parameter of the program portion represented by the shape. For instance, when the shape is a rectangle, such rectangle can represent a first type of control structure represented by the shape, wherein when the shape is a diamond, the diamond can represent a second type of control structure, and so on.

Further, each shape can include additional information regarding the state of the software instruction sequence during an execution instance (at the point in the execution instance represented by the shape). This additional information can include, but is not limited to, a timestamp that indicates when the point in the execution instance was reached, input values to a control structure, values output by a control structure, values of variables at the control structure, etc. Alternatively, the shapes can be selectable, wherein selection of a shape can cause the additional information to be presented (e.g., in a popup window, in a new window, in a new tab, etc.).

Still further, the shapes of the visualization 312 can be both vertically and horizontally offset from one another. A vertical offset, where a first shape is vertically above a second shape, indicates that a first control structure (represented by the first shape) was reached in the execution instance prior to a second control structure (represented by the second shape). A horizontal offset, where a first shape is to the left of a second shape, indicates that a second control structure (represented by the second shape) is nested in the first control structure (represented by the first shape). Accordingly, an analyst can review the shape of the flowchart-like visualization 312 and understand the "shape" of the execution instance.

Still further, parts of the visualization 312 can be expanded or contracted by an analyst, thereby allowing the analyst to focus on portions of the execution instance that are of interest to the analyst. For example, the visualization 312 can include a selectable graphical element that corresponds to a shape; upon receipt of a selection of the graphical element, the visualization component 310 can expand or contract a shape or collection of shapes. That is, if a shape represents a control structure with nested structures, selection of the graphical element corresponding to the shape can cause shapes representative of the nested structures to be displayed or not displayed. For instance, selection of the graphical element can result in all shapes horizontally offset from the shape being hidden. Effectively, then, the analyst can "zoom in" or "zoom out" on portions of the visualization 312 that are representative of portions of the execution instance that are of interest to the analyst.

The visualization component 310 can be implemented in a variety of manners. For instance, the visualization component 310 can be a standalone application that is configured to access and visualize the instrumentation data 208. In another example, the visualization component 310 can be a browser-based application. In such case, the instrumentation data 208 can be stored in computer-readable storage of a server computing device. The analyst can execute a web browser, and direct the web browser to a URL corresponding to the visualization component 310. The analyst may then be prompted for a username and password, which can be used to identify the instrumentation data 208 that the analyst is authorized to access. The analyst may then set forth a query or request as to what is desirably visualized, where the query or request can identify a time range, an execution instance, a portion of the software instruction sequence that is to be analyzed, or other suitable data. The visualization component 310 can construct a visualization in accordance with the request, and transmit the visualization 312 by way of a network connection to the client device operated by the analyst. The browser executing on the client device can then display the visualization 312. The analyst can subsequently interact with the visualization in the manner described above.

Figure 4A:
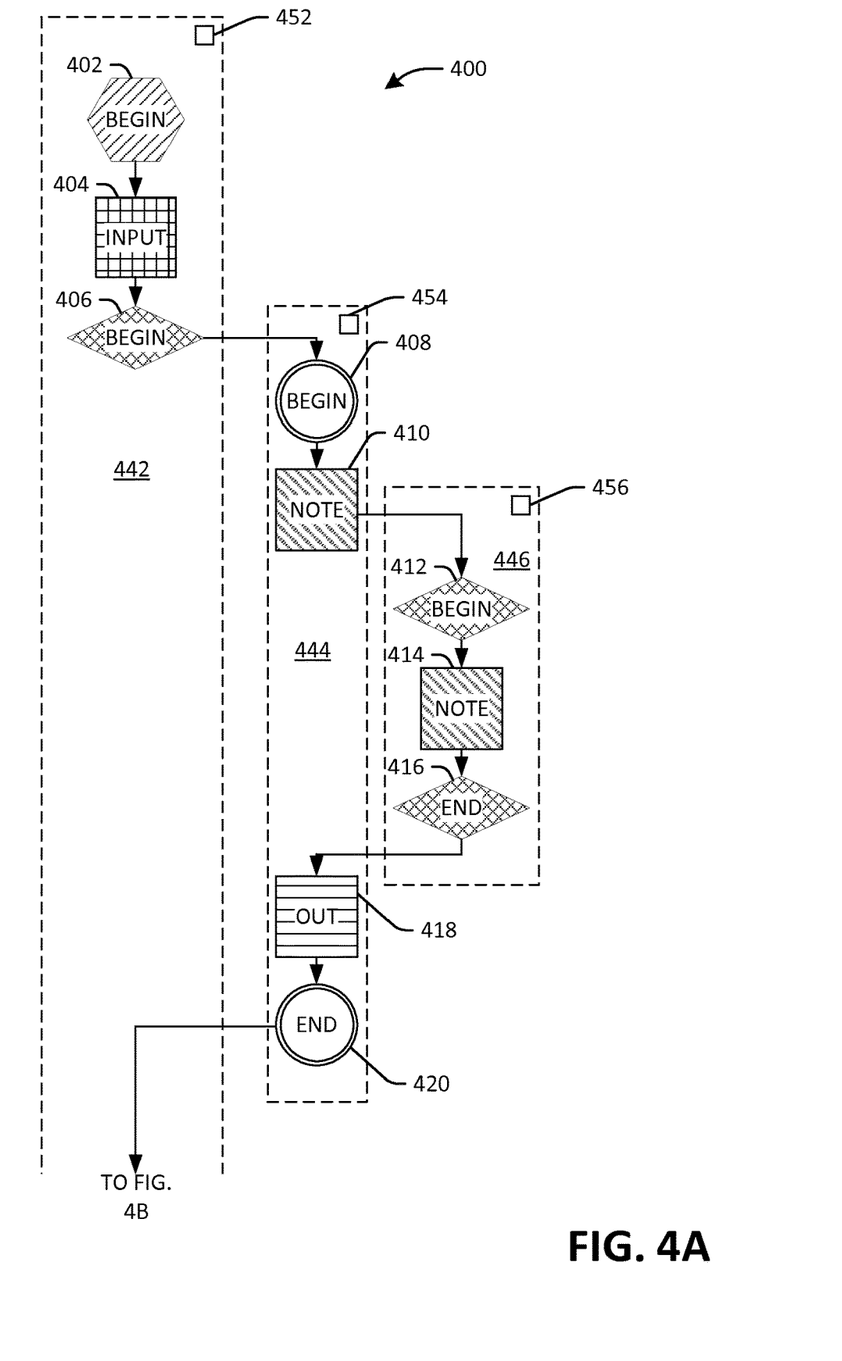
FIGS. 4A and 4B illustrate an exemplary visualization of an execution instance of a computer instruction sequence.
Figure 4B:
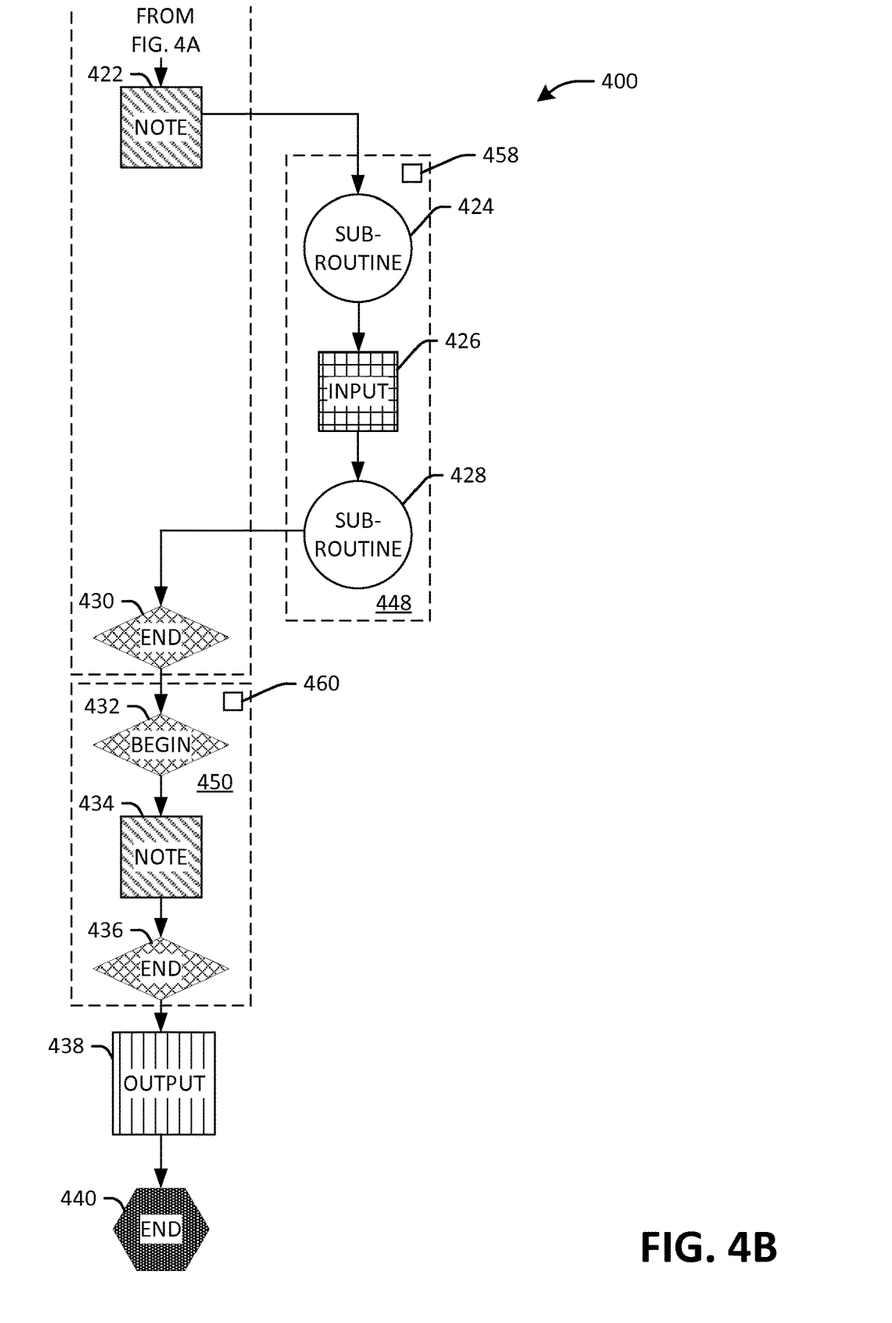

Turning now to FIGS. 4A and 4B, an exemplary visualization 400 of an instruction sequence execution instance is illustrated, where the visualization 400 is generated by the visualization component 310. While the visualization 400 is depicted in flowchart form, it is to be understood that other forms of the visualization 400 are also contemplated, and any suitable form that assists an analyst in understanding the underlying behavior of the instruction sequence during the execution instance is contemplated.

The visualization 400 comprises a plurality of colored shapes 402-440, which are respectively representative of a plurality of control structures or features encountered in the execution instance represented by the visualization 400. As described previously, the shapes can be of different types and colors, wherein a combination of color and type of the shape can be representative of a type of control structure represented by the shape. For instance, the shape 402 (a green hexagon) represents beginning of the execution instance, the shape 404 (a green square) represents input data at a certain point in the execution instance, the shape 406 (an orange diamond) represents a branch terminal (e.g., a beginning of a branch) in the execution instance, the shape 408 (green concentric circles) represents a loop terminal, the shape 410 (a yellow square) represents a note inserted by the developer (or automatically generated), the shape 412 (an orange diamond) represents another branch terminal (e.g., a beginning of an if-else branch), the shape 414 (a yellow square) represents another note inserted by the developer, and the shape 416 (another orange diamond) represents another branch terminal (e.g., an end of the if-else branch).

The shape 418 (a blue square) represents intermediate values (results of the actions in the loop), and the shape 420 (concentric green circles) represents another loop terminal (an end of the loop referenced above). The shape 422 (a yellow square) represents a note inserted by the developer, to provide insight as to values used in the branch. The shape 424 (a purple circle) represents a terminal (a beginning) for a subroutine executed in the execution instance, the shape 426 (a green square) represents inputs provided to the subroutine, and the shape 428 (a purple circle) represents another terminal (an end) of the sub-routine. The shape 430 (an orange diamond) represents a terminal (an end) of the above-referenced branch.

The shape 432 (an orange diamond) represents a terminal for another branch taken in the visualized execution instance, the shape 434 (a yellow square) represents notes input by the developer that describes operations in the branch, and the shape 436 (an orange diamond) represents an end terminal of the branch. The shape 438 (a pink square) represents outputs generated during the execution instance, and the terminal 440 (a red hexagon) represents an end terminal of the execution instance. Thus, combinations of shape type and color can provide visual cues to an analyst as to information represented by the shapes. For instance, comparing one typical combination to a peculiar combination can yield a (quick) visual cue as to where in the peculiar instruction sequence the execution appeared to significantly diverge (and warrants further investigation). Additionally, the shapes can be selectable, wherein selection of a shape causes underlying information about the feature represented by the shape to be presented to the analyst. This underlying information can be, for example, variable values, input values, time that an underlying control structure was encountered during instruction sequence execution, source code corresponding to the underlying structure, and so forth.

Further, as indicated previously, shapes can be vertically offset from one another to represent a sequence that program features were encountered during the execution instance and/or shapes can be horizontally offset from one another to represent nested relationships. For example, the shape 408 is vertically beneath the shape 406, which indicates that, during the execution instance, the branch represented by the shape 406 was taken prior to the loop represented by the shape 408 being encountered. Further, the shape 408 is horizontally offset from the shape 406, which indicates that the loop is nested in the branch.

Furthermore, the visualization 400 can include background sections 442-450 which graphically identifies related groups of shapes, and thus related groups of control structures. For example, the background section 442 groups the shapes 406, 422, and 432, such that the background section 442 visually indicates to the analyst that the shapes 406, 422, and 432 represent control structures belonging to the same branch. Similarly, the background section 444 groups the shapes 408, 410, 418, and 420, which visually indicates to the analyst that such shapes represent control structures belonging to the same loop. The background section 446 groups the shapes 412-416, which visually indicates to the analyst that control structures represented by the shapes 412-416 belong to the same branch. Description of the background sections 448 and 450 are omitted for sake of brevity.

The visualization 400 further includes selectable graphical icons 452-460, which respectively correspond to the background sections 442-450. The icons 452-460, when selected by the analyst, cause shapes or groups of shapes to expand or collapse. For example, selection of the icon 458 can cause the background section 448 to contract, such that the shapes 412-416 are removed from the visualization 400. The analyst may wish to cause the background section 448 to contract to simplify the visualization 400, or the analyst may not have interest in the control structures represented by the shapes 412-416. After a background section is collapsed, another icon may appear, where selection of the icon causes the background section to be expanded. Further, while not shown, the visualization 400 can include a legend, which can explain features of the visualization 400 to the analyst.

Further, while not illustrated, the visualization 400 can include a text entry field that can be populated by a query, and the visualization can be searched based upon the query set forth in the text entry field. For example, each shape in the visualization 400 may have text corresponding thereto, wherein such text can be a title, descriptive metadata, text represented by the shape, and so forth. The text corresponding to the shapes can be searched based upon the query, and the visualization 400 can be updated based upon the search results. For instance, the visualization 400 can be updated to present shapes (nodes) that are relevant to the query (and optionally sub-nodes). In a specific example, the query can identify a node label, and the visualization 400 can be updated to depict nodes with the node label. In another example, the visualization 400 can include a list of selectable node types, and the visualization 400 can be updated responsive to a user selecting one of the node types (such that the visualization 400 includes nodes having the selected node type). In yet another example, the user can set forth a voice query, a gesture, or the like, and the visualization 400 can be updated in response to the user setting forth the voice query, the gesture, etc.

Figure 5:
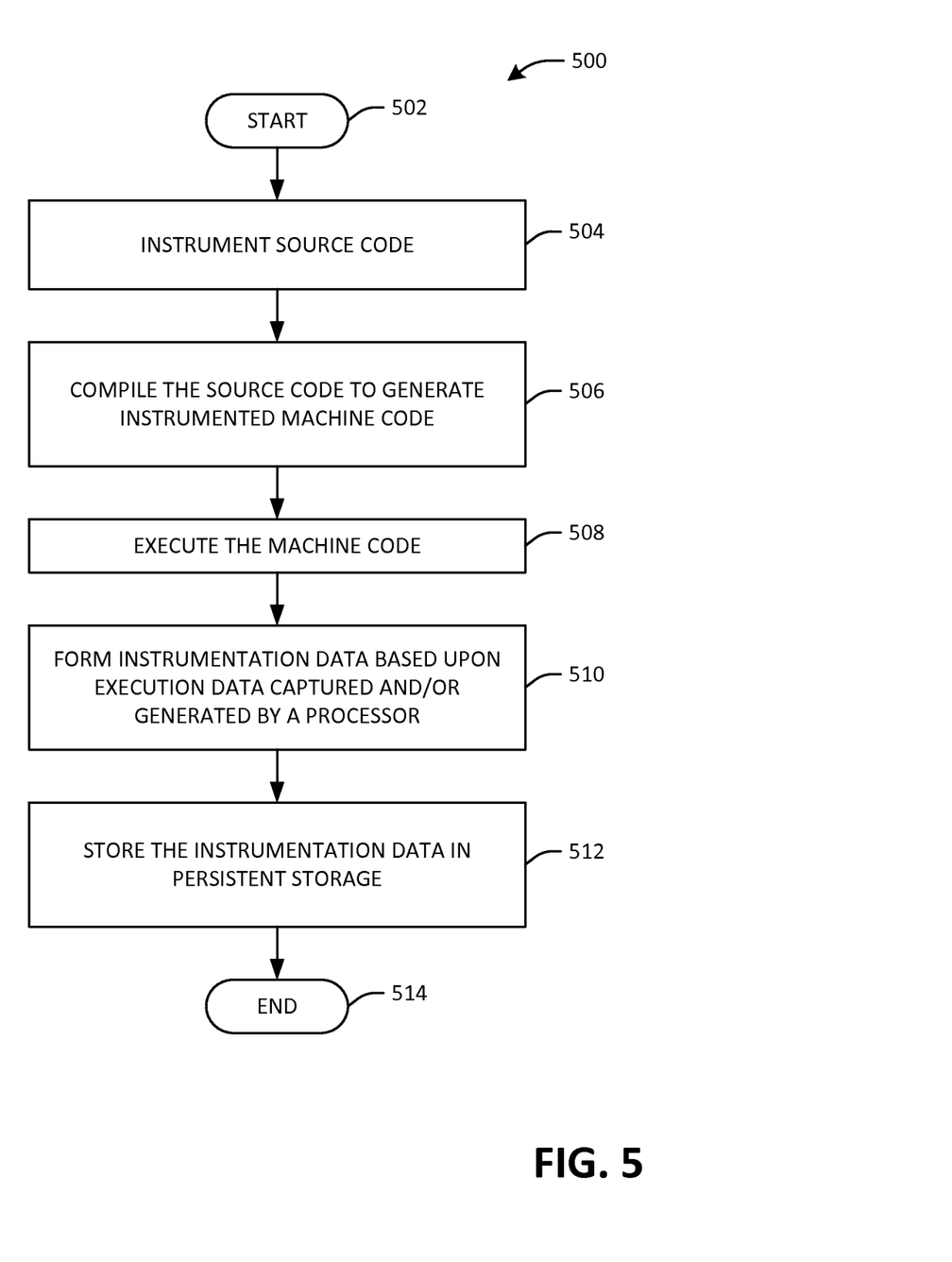
FIG. 5 is a flow diagram that illustrates an exemplary methodology for collecting and storing instruction sequence execution data.
Figure 6:
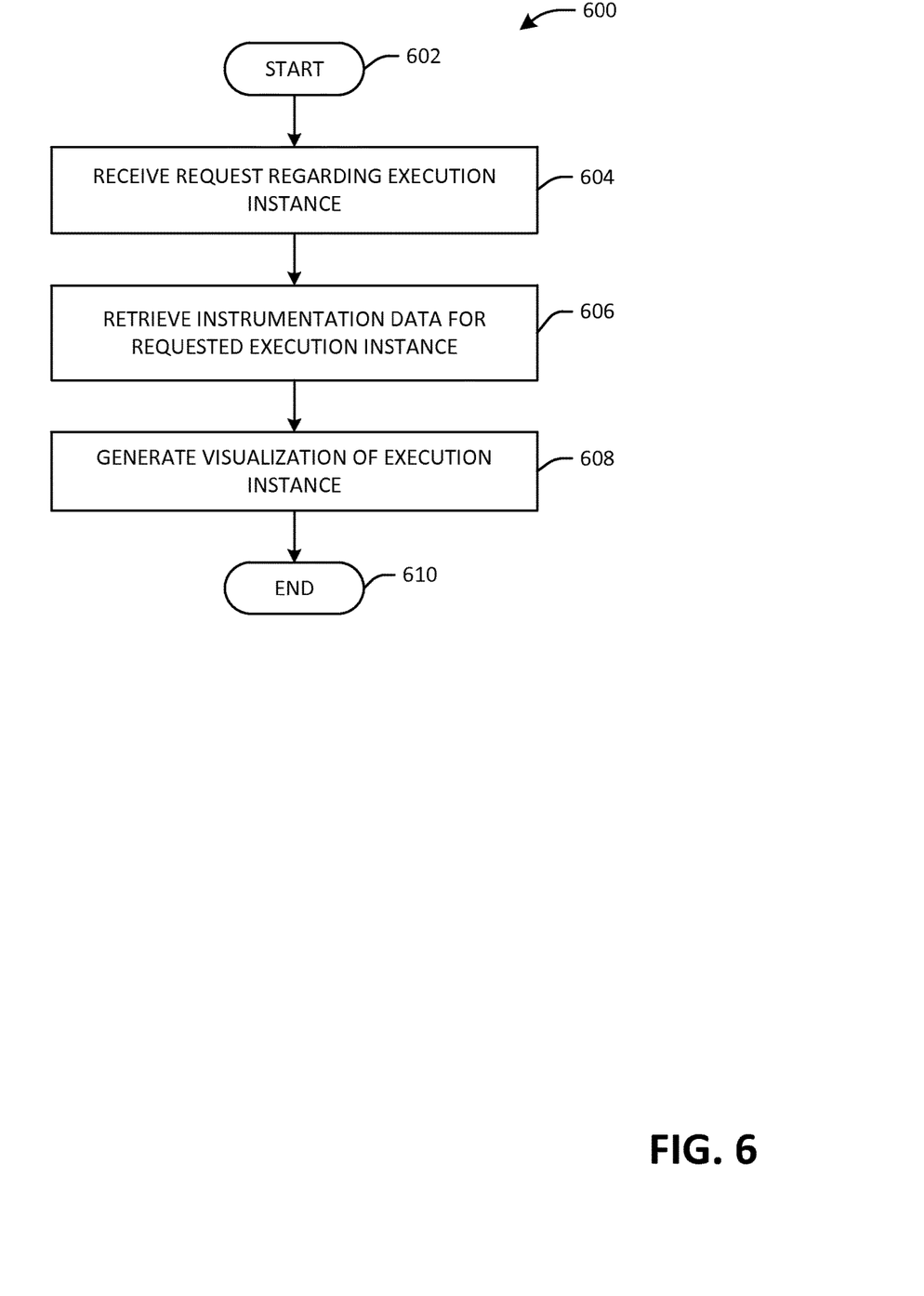
FIG. 6 is a flow diagram that illustrates an exemplary methodology for creating and displaying a visualization of an execution instance of a computer instruction sequence.

FIGS. 5 and 6 illustrate exemplary methodologies relating to instrumenting source code and analyzing an execution instance corresponding to the source code. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 5 illustrates an exemplary methodology 500 for collecting and storing instruction sequence execution data. The methodology 500 begins at 502, and at 504 source code is instrumented by a developer through utilization of reporting functions in a recording library supported by an application development environment. At 506, the source code (including the calls to the recording functions) is compiled, resulting in formation of instrumented machine code, which is configured for execution by a processor. The instrumented machine code, when executed by the processor, causes the processor to generate and/or capture execution data as specified in the recording functions. In the exemplary methodology 500 as depicted, the source code is instrumented by the developer prior to the source code being compiled. As noted above, however, the source code can be instrumented automatically by a compiler at compile-time.

At 508, the instrumented machine code is executed by the processor, resulting in capture and/or generation of execution data. The execution data can be retained in memory that is accessible to the processor, and can be accumulated for an execution instance of the instruction sequence defined by the source code. At 510, responsive to an execution instance being completed, the execution data is acquired and placed in format that is suitable for subsequent processing. As noted above, this formatted data can be referred to as instrumentation data. In an example, the instrumentation data can be an XML file, a database file, a comma separated value file, etc. At 512, the instrumentation data is stored in persistent computer-readable storage, such as memory, disk, or the like. The methodology 500 completes at 514.

FIG. 6 illustrates an exemplary methodology 600 for creating and displaying a visualization of an execution instance of a computer-executable instruction sequence (as embodied in machine code), wherein the visualization is created and displayed based upon the instrumentation data referenced above. The methodology 600 starts at 602, and at 604 a query or request pertaining to an execution instance that is of interest to an analyst is received. The query or request can identify the execution instance, can identify a time corresponding to the execution instance, can identify a particular portion of the execution instance that is of interest, etc. The query may be a textual query, a query formed based upon selection of a graphical icon that is representative of the execution instance, a spoken query, etc.

At 606, instrumentation data for the requested execution instance is retrieved. At 608, a visualization is generated based upon the identified execution instance, where the visualization provides the analyst with information that can assist the analyst in understanding how a certain output state was reached during the execution instance. The methodology 600 completes at 610.

Figure 7:
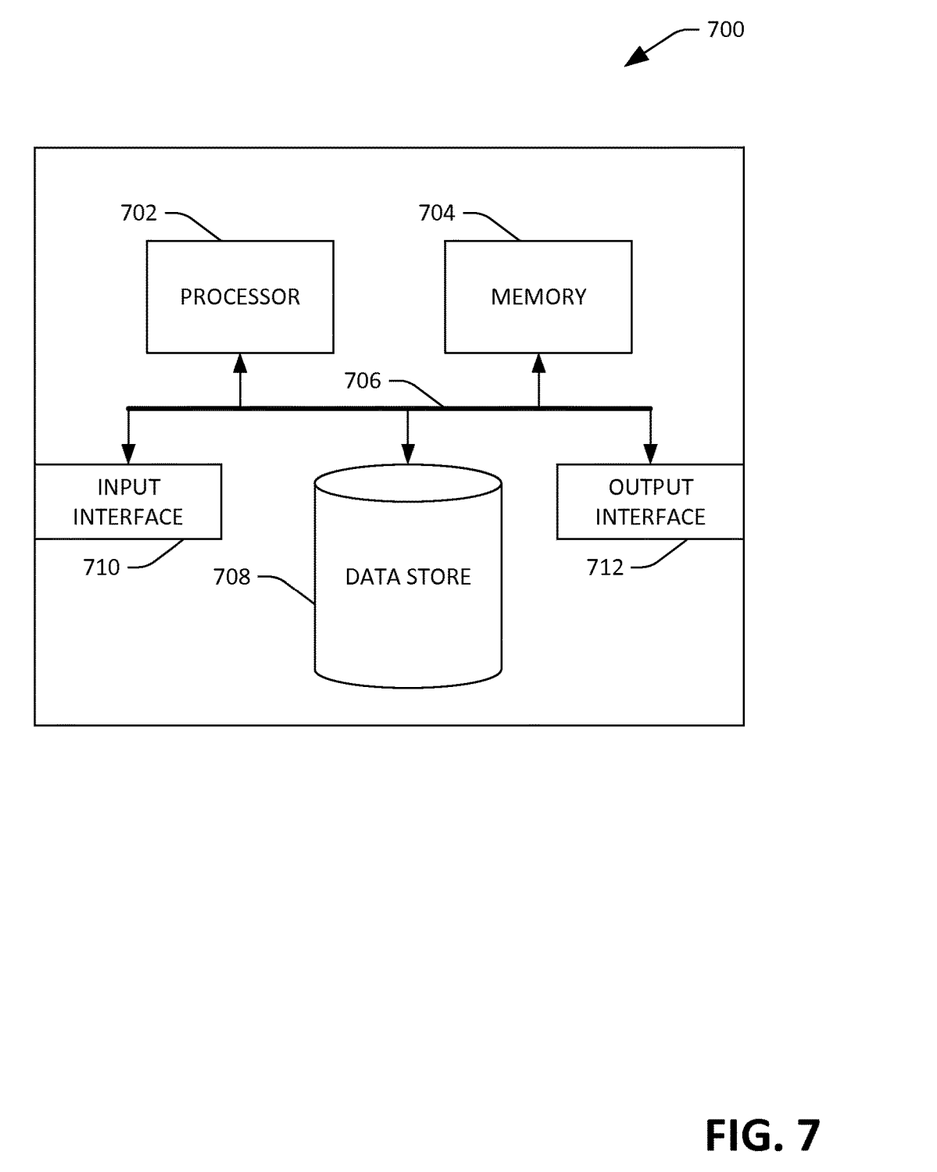
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be used in a system that supports instrumenting source code. By way of another example, the computing device 700 can be used in a system that is configured to generate a visualization of an execution instance of an instruction sequence. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store execution data, instrumentation data, visualization data, etc.

The computing device 700 additionally includes a data store 708 that is accessible by the processor 702 by way of the system bus 706. The data store 708 may include executable instructions, execution data, instrumentation data, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method executed by a processor, the method comprising:
   storing instrumentation data in a data repository, said instrumentation data indicative of a behavior for each of a plurality of execution instances of an operational computer instruction sequence that occurred in the past, the instrumentation data generated based upon data output by another processor that executed the operational computer instruction sequence during the execution instances, the data output by the other processor based upon calls to recording functions that were previously inserted into source code of the operational computer instruction sequence, the recording functions included in a function library natively supported by an application development framework;
receiving a request to generate a visualization of behavior of a specific execution instance in the execution instances of the operational computer instruction sequence, the specific execution instance being a runtime execution of the operational computer instruction sequence;
generating the visualization of the specific execution instance responsive to receipt of the request, the visualization generated based upon the stored instrumentation data, the visualization comprising a first graphical shape and a second graphical shape, the first graphical shape is representative of a first control structure of the operational computer instruction sequence, the second graphical shape is representative of a second control structure of the operational computer instruction sequence, the first graphical shape being vertically offset from the second graphical shape to indicate that the first control structure was reached prior to the second control structure during the specific execution instance, and wherein the first graphical shape is horizontally offset from the second graphical shape in the visualization to indicate that the second control structure is nested in the first control structure;
displaying the visualization on a display to an analyst; and
allowing the analyst to review the shapes of the visualization and expand or contract parts of the visualization to focus on portions of the execution instance that are of interest to the analyst.

2. The method of claim 1, the visualization identifying a sequence of program structures of the operational computer instruction sequence processed by the processor during the specific execution instance.

3. The method of claim 1, wherein generating the visualization comprises:
assigning the first graphical shape a first color; and assigning the second graphical shape a second color, the first color and the second color representative of a type of the first program structure and a type of the second program structure, respectively.

4. The method of claim 1, further comprising:
responsive to receiving a selection of the first graphical shape, presenting values of variables during the specific execution instance that pertain to the first control structure.

5. The method of claim 4, the values being one of:
input values to the first control structure during the specific execution instance; or
values of variables subsequent to the first control structure being executed during the specific instance.

6. A computing system comprising:
a processor; and
a memory comprising instructions that, when executed by the processor, cause the processor to perform acts comprising:
generating a visualization of behavior of an execution instance of an operational computer instruction sequence that occurred in the past based upon instrumentation data, the instrumentation data generated during runtime execution of the operational computer instruction sequence in an operational environment over a period of time, the instrumentation data based upon calls to recording functions that were previously inserted into source code of the operational computer instruction sequence, the visualization identifies when a first structure of the operational computer instruction sequence was reached in the execution instance relative to when a second structure of the operational computer instruction sequence was reached in the execution, wherein the visualization comprises:
a first graphical shape that is representative of the first structure, and a second graphical shape that is representative of the second structure, the first graphical shape being vertically offset from the second graphical shape to indicate that the first structure was reached during the execution instance prior to the second structure, and the second graphical shape being horizontally offset from the first graphical shape to indicate that the second structure is nested in the first structure;
displaying the visualization on a display to an analyst; and
allowing the analyst to review the shapes of the visualization and expand or contract parts of the visualization to focus on portions of the execution instance that are of interest to the analyst.

7. The computing system of claim 6, the recording functions included in a function library that is natively supported by an application development framework.

8. The computing system of claim 7, the calls to the recording functions inserted into the source code by a developer of the operational computer instruction sequence.

9. The computing system of claim 7, the acts further comprising compiling the source code to generate machine code, wherein the calls to the recording functions are inserted into the source code during the compiling of the source code, the machine code is instrumented based upon the recording functions called in the source code.

10. The computing system of claim 6, the recording functions comprise a function that is configured to cause another processor that executes the operational computer instruction sequence during the execution instance to identify a branch of the operational computer instruction sequence taken during the execution instance, the other processor being one of the processor of the computing system or a different processor.

11. The computing system of claim 6, the recording functions comprise a function that is configured to cause another processor that executes the operational computer instruction sequence during the execution instance to identify a loop of the operational computer instruction sequence iterated over during the execution instance, the other processor being one of the processor of the computing system or a different processor.

12. The computing system of claim 6, the recording functions comprise a function that is configured to cause the processor that executes the operational computer instruction sequence during the execution instance to output at least one of:
values of variables prior to a loop of the operational computer instruction sequence being iterated over during the execution instance;
values of variables subsequent to a loop of the operational computer instruction sequence being iterated over during the execution instance;
values of variables prior to a subroutine of the operational computer instruction sequence being executed during the execution instance;
values of variables subsequent to a subroutine of the operational computer instruction sequence being executed during the execution instance; or
values of variables during each iteration of a loop being iterated over during the execution instance.

13. The computing system of claim 6, the first structure being one of a branch, a loop, and a subroutine, the second structure being one of a branch, a loop, and a subroutine.

14. The computing system of claim 6, wherein the visualization further comprises a graphical element that is representative of variable values during the execution instance that pertain to the first structure.

15. The computing system of claim 14, the acts further comprising: responsive to receipt of a selection of the graphical element, displaying the variable values on the display.

16. A computer readable storage medium comprising instructions that, when executed by a processor, cause the processor to perform acts comprising:

storing instrumentation data in a data repository, said instrumentation data indicative of a behavior of an operational computer instruction sequence during an execution instance that occurred in the past, the instrumentation data based upon calls made during runtime execution of the operational computer instruction sequence to recording functions that were previously inserted into source code of the operational computer instruction sequence;

generating a visualization of the behavior of the execution instance of the operational computer instruction sequence using the stored instrumentation data, the visualization identifies when a first control structure of the operational computer instruction sequence was reached in the execution instance relative to when a second control structure of the operational computer instruction sequence was reached in the execution instance, wherein the visualization comprises:

a first graphical shape that is representative of the first structure; and a second graphical shape that is representative of the second structure, the first graphical shape being vertical offset from the second graphical shape to indicate that the first structure was reached during the execution instance prior to the second structure, and the second graphical shape being horizontally offset from the first graphical shape to indicate that the second structure is nested in the first structure;

displaying the visualization on a display to an analyst; and allowing the analyst to review the shapes of the visualization and expand or contract parts of the visualization to focus on portions of the execution instance that are of interest to the analyst.

\* \* \* \* \*